(12) United States Patent
Shen et al.

(10) Patent No.: US 8,665,599 B2
(45) Date of Patent: Mar. 4, 2014

(54) PORTABLE EXTERNAL POWER-SUPPLYING DEVICE

(75) Inventors: Hung-Pin Shen, Tainan (TW); Lung-Hua Wu, Yuli Township, Hualien County (TW); Yen-Ling Chen, Kaohsiung (TW)

(73) Assignee: Hugee Technology Co., Ltd., New Taipei (TW)

( * ) Notice: Subject to any disclaimer, the term of this patent is extended or adjusted under 35 U.S.C. 154(b) by 253 days.

(21) Appl. No.: 13/344,857

(22) Filed: Jan. 6, 2012

(65) Prior Publication Data

US 2013/0176688 A1    Jul. 11, 2013

(51) Int. Cl.
*H05K 1/14*    (2006.01)
*H01G 4/30*    (2006.01)

(52) U.S. Cl.
USPC ........... 361/736; 361/735; 361/728; 361/790; 361/301.4

(58) Field of Classification Search
USPC ............ 361/735, 736, 729, 728, 679.01, 600, 361/790, 301.4; 257/686
See application file for complete search history.

(56) References Cited

U.S. PATENT DOCUMENTS

2009/0195995 A1* 8/2009 Hannula et al. ................ 361/728
2010/0146308 A1* 6/2010 Gioscia et al. ................. 713/300

* cited by examiner

*Primary Examiner* — Hoa C Nguyen
*Assistant Examiner* — Ahmad D Barnes
(74) *Attorney, Agent, or Firm* — Jackson IPG PLLC

(57) ABSTRACT

A portable external power-supplying device is disclosed. The portable external power-supplying device implements a unique mechanism to detachably assemble battery units whose number can be adjusted according to user needs, which means the overall aggregate capacity of the portable external power-supplying device is adjustable. The portable external power-supplying device is adaptive to connect and charge a portable electronic device.

5 Claims, 6 Drawing Sheets

PORTABLE EXTERNAL POWER-SUPPLYING DEVICE

BACKGROUND OF THE INVENTION

1. Technical Field

The present invention relates to external power supply for consumer electronics, and more particularly, to a power-supplying device adaptive to connect a portable electronic device and act as a backup power source that provides a variable power capacity.

2. Description of Related Art

Currently, a rechargeable battery is a common power source for various portable consumer electronics, such as mobile phones, laptops, digital cameras, music players, etc.

For charging such a rechargeable battery, a specific charger is required to adjust the AC power from the power grid into a certain potential. Where the power grid is inaccessible, charging is impossible and the portable device using the battery cannot serve when the battery is exhausted.

To avoid this plight, a portable power supply, or a "power pack", has been developed. By using the same, users can charge their consumer electronics everywhere despite the accessibility of the power grid.

The existing portable power supply is mainly composed of a rechargeable battery and a control circuit that are packed in an enclosure. The commercialized products are provided with different battery capacities. While a portable power supply having a small capacity is usually compact and light, it cannot serve long. On the other hand, a portable power supply having a small capacity serves long yet is bulky and less portable. In addition, the existing rechargeable battery has its life subject to its age and/or frequency of use and once the battery become poor in performance or broken, the whole power supply is unusable.

SUMMARY OF THE INVENTION

In view of the shortcomings of the prior-art device as stated above, the present invention provides a portable external power-supplying device with a variable power capacity. The power-supplying device has detachably combined battery units whose number can be adjusted according to user needs, which means the overall volume and weight of the power-supplying device is manageable. The individual battery units are replaceable, so the performance of the power-supplying device can be easily maintained. This helps to preserve resources.

To this end, according to the present invention, a portable external power-supplying device comprises a power control module and one or more battery units whose aggregate capacity is variable. The power control module includes a circuit board, an indicator light set, a first port, a power inlet, a power outlet and others. The individual battery unit includes a controller, a cell, a second port and a third port.

When communicated with the battery units, the control module charges the battery units through the power inlet for later use. In use, the control module supplies power to a portable electronic device through the power outlet.

The control module can charge one or more battery units. These charged battery units can be easily assembled or separated so that one or more battery units can be used to charge according to practical needs. As each battery is subject to its cycle life, once any of the individual battery units is out of use, the power-supplying device can be replenished by replacing the broken battery unit with a new one. As compared with retiring the whole prior-art device, this significantly reduces costs and is friendlier to the environment.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
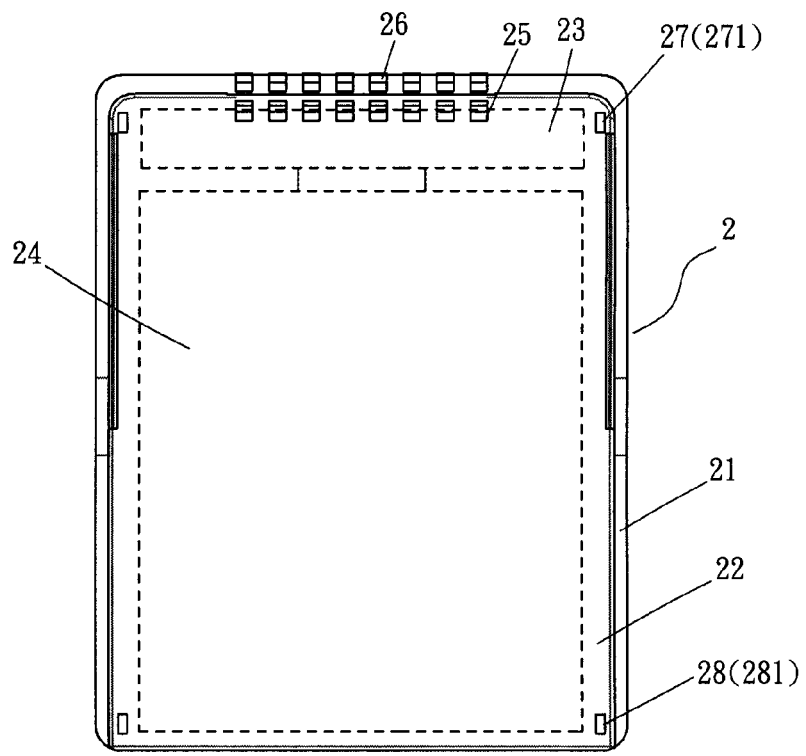
FIG. 1 is a top view of an individual battery unit according to the present invention.
Figure 2:
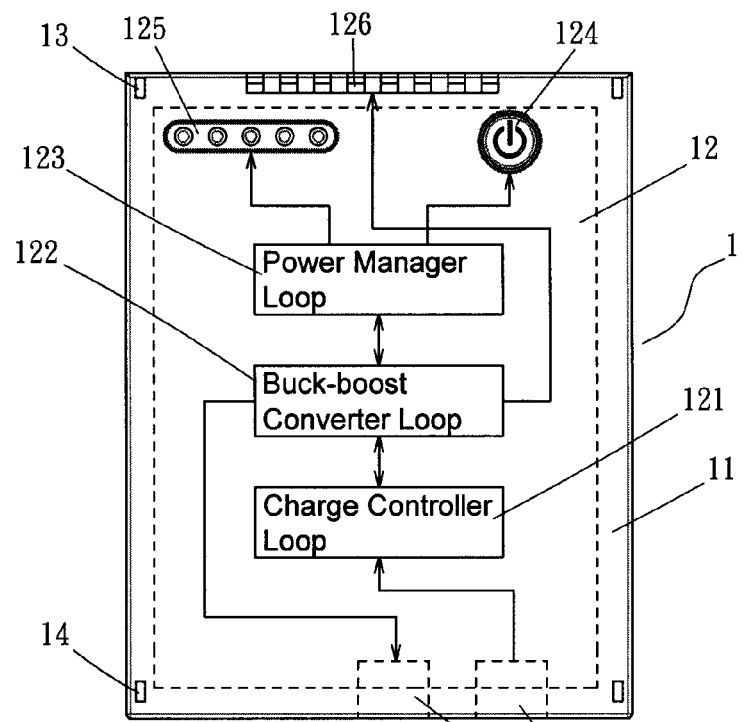
FIG. 2 is a schematic drawing illustrating a power control module according to the present invention.

Referring to FIG. 1 and FIG. 2, in the present invention, a portable external power-supplying device primarily comprises a power control module 1 and one or more individual battery units 2, 3, 4, 5.

As shown in FIG. 2, the power control module 1 has an enclosure 11 containing therein a circuit board 12. On the circuit board 12, there are a charge controller loop 121, a buck-boost converter loop 122, a power manager loop 123, a button switch 124, an indicator light set 125, a first port 126, a power inlet 127 and a power outlet 128. The enclosure 11 has its back provided with a positioning hole 13 and a fixing hole 14.

The power inlet 127 of the power control module 1 is electrically connected to the charge controller loop 121, while the charge controller loop 121, the buck-boost converter loop 122, and the power manager loop 123 are electrically connected together. The power manager loop 123 is electrically connected to the button switch 124 and the indicator light set 125. Meantime, the buck-boost converter loop 122 is electrically connected to the power outlet 128 and the first port 126.

The button switch 124, the indicator light set 125, the first port 126, the power inlet 127, and the power outlet 128 of the circuit board 12 are exposed outside the enclosure 11 of the power control module 1 to be visible, accessible and operable to a user from exterior.

Therein, the power inlet 127 is adaptive to connect a terminal of an adapter and input a DC power to the power control module 1. The power outlet 128 is adaptive to connect a battery of a portable electronic device that is to be charged.

As shown in FIG. 1, the enclosure 21 of each of the individual battery units 2, 3, 4, 5 has its top formed with an accommodating recess 22. The individual battery unit 2 has therein a controller 23, a cell 24, a second port 25 and a third port 26. The controller 23 is electrically connected to the cell 24, the second port 25 and the third port 26. The second port 25 faces the accommodating recess 22 of the enclosure 21, and the third port 26 is located at a side of the enclosure 21. The enclosure 21 of the individual battery unit 2 has a positioning pin 27 and a retaining hook 28 in the accommodating recess 22. Each of the individual battery units 2, 3, 4, 5 has its back provided with a positioning hole 271 and a fixing hole 281 corresponding to the positioning pin 27 and the retaining hook 28 on another said individual battery unit, respectively.

Figure 3:
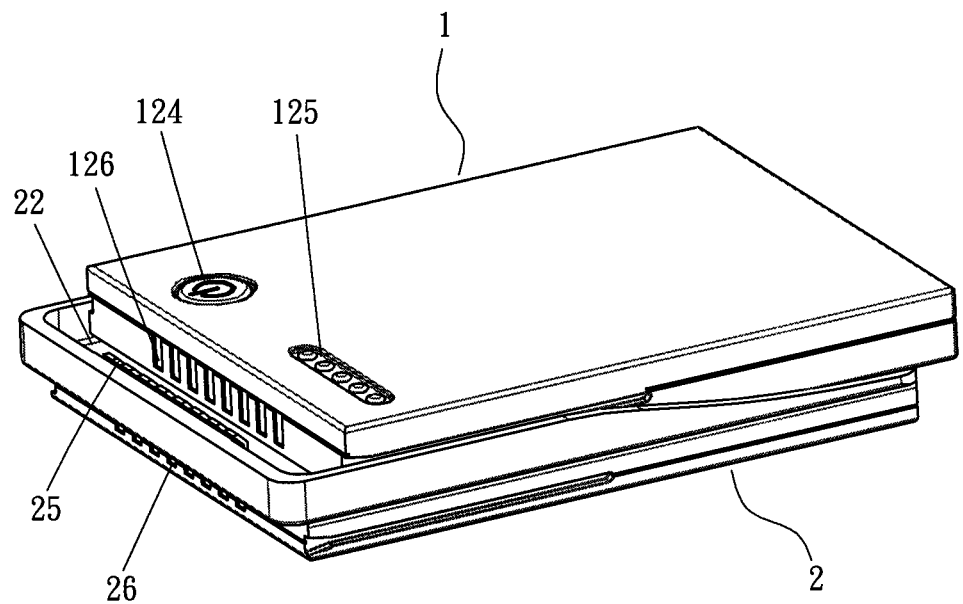
FIG. 3 is a perspective view of the assembled power control module and individual battery unit according to the present invention.
Figure 4:
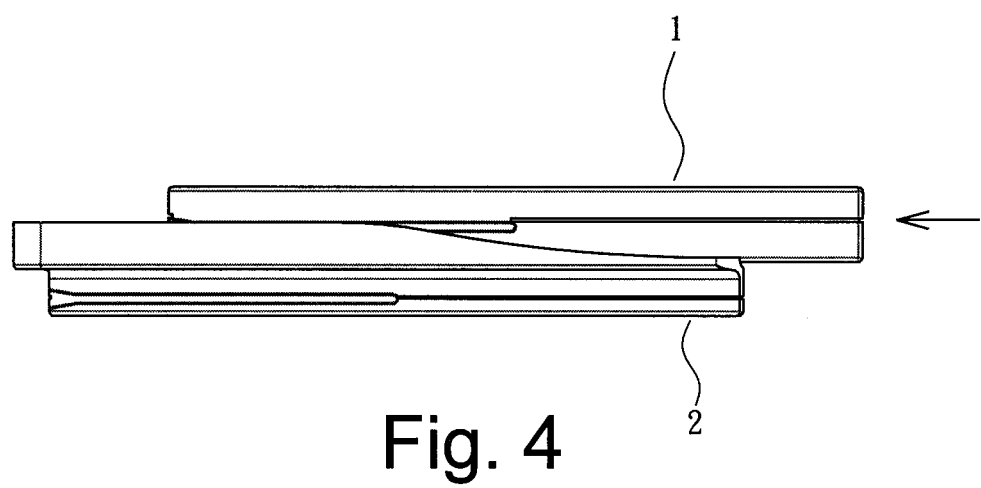
FIG. 4 is a lateral view of the assembly of FIG. 3.

As shown in FIG. 3 and FIG. 4, to assemble the components, the power control module 1 slides into the accommodating recess 22 of the enclosure 21 of the individual battery unit 2, such that the first port 126 of the power control module 1 gets electrically connected to the second port 25 open to the accommodating recess 22 of the individual battery unit 2, and, at the same time, the positioning hole 13 and the fixing hole 14 of the power control module 1 get engaged with the positioning pin 127 and the retaining hook 28 of the individual battery unit 2, respectively.

Figure 5:
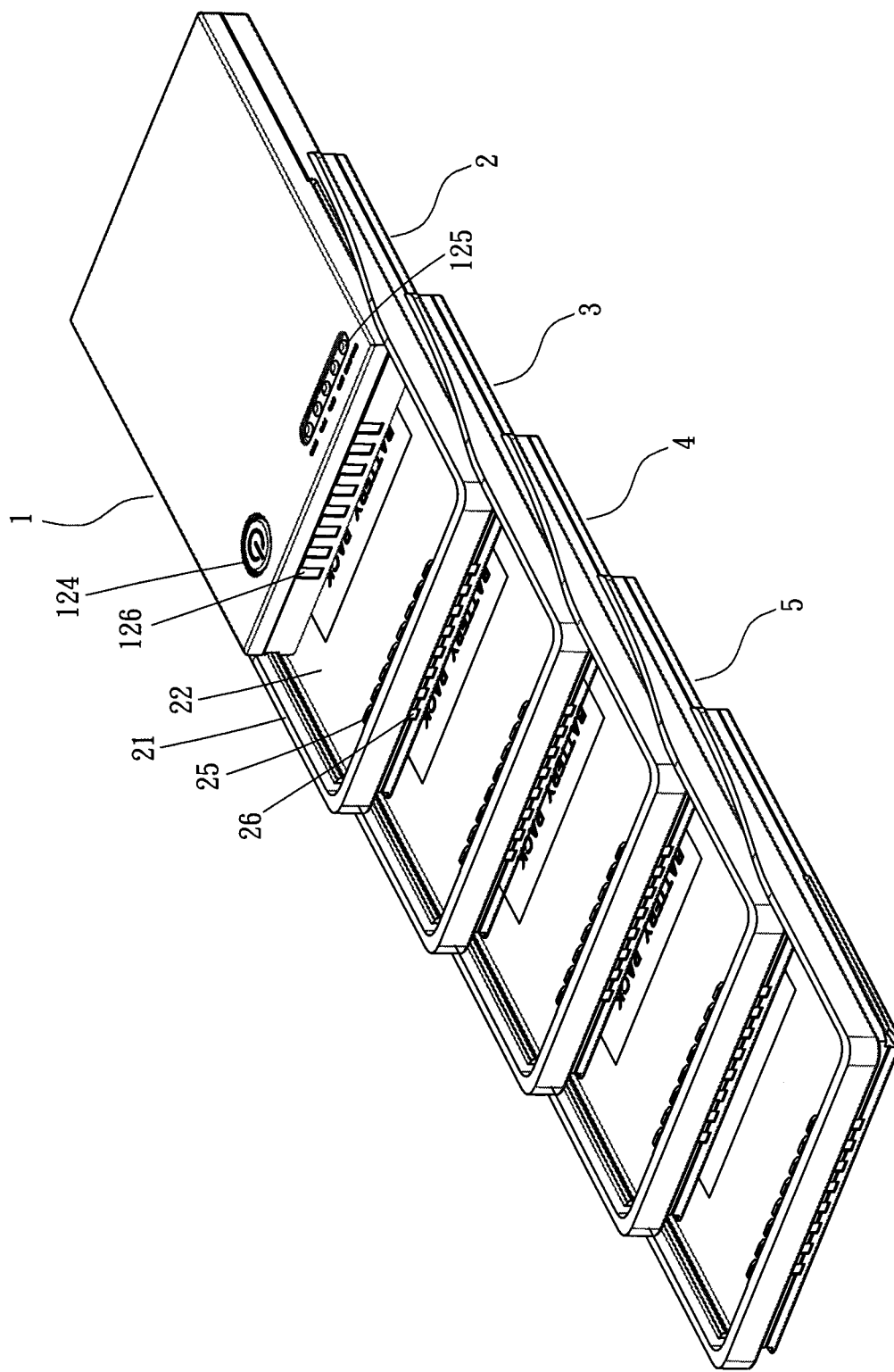
FIG. 5 shows the power control module and plural said individual battery units to be assembled.
Figure 6:
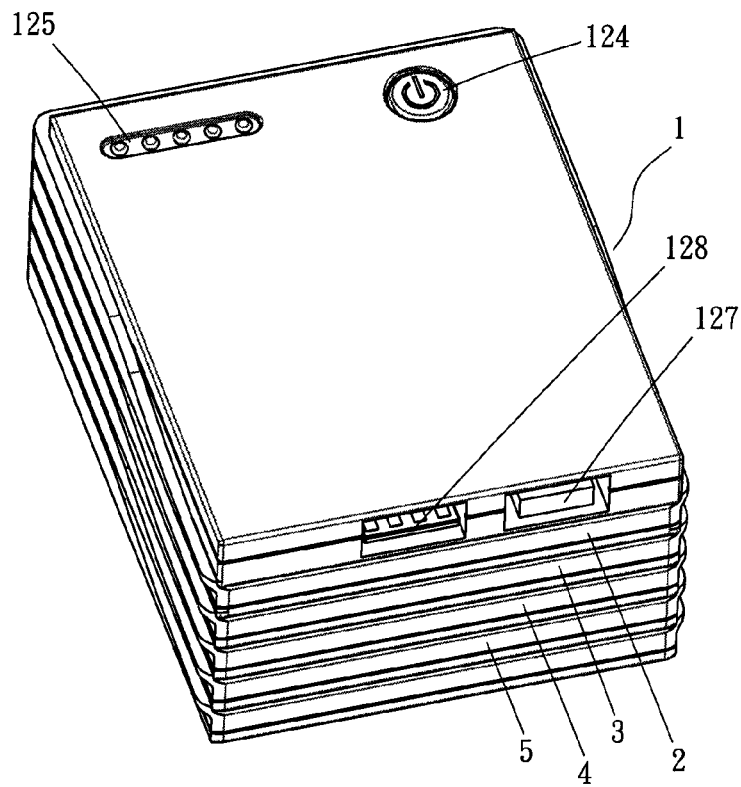
FIG. 6 is a perspective view of the assembled power control module and individual battery units according to the present invention.
Figure 7:
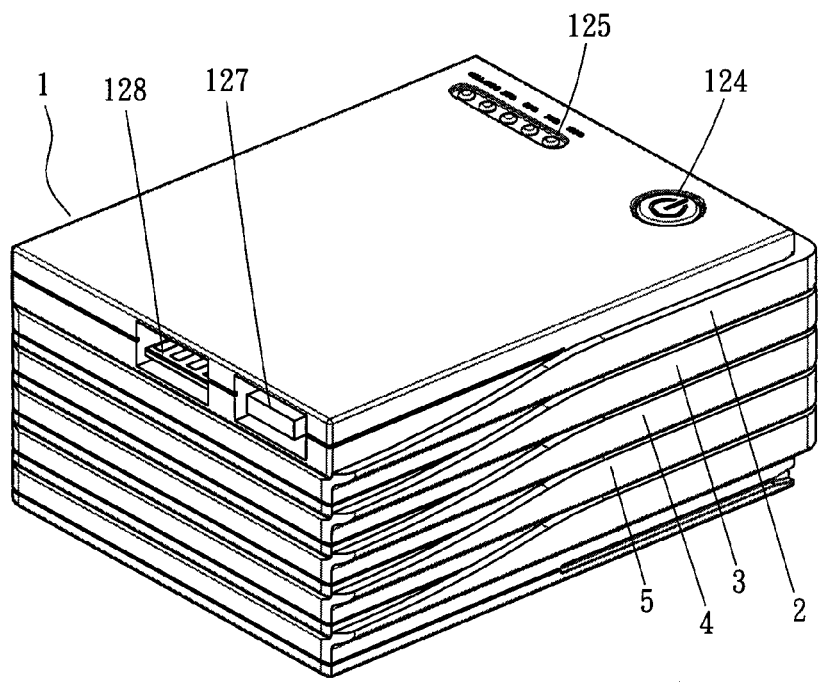
FIG. 7 is another perspective view of the assembly of FIG. 6.

As shown in FIG. 5 through FIG. 7, after the power control module 1 is assembled with the individual battery unit 2, the second individual battery unit 3, third individual battery unit 4, fourth individual battery unit 5 and so on can be successively combined in the manner described previously to make the second port 25 of one battery unit electrically connected to and positioned by the third port 26 of another battery unit.

By doing so, the device of the present invention can have the number of the individual battery units 2, 3, 4, 5 increased or decreased according to practical needs. Such a slide-in operation as shown in FIG. 5 through FIG. 7 allows a user to use as many battery units as he/she needs. The individual battery units 2, 3, 4, 5 thus assembled are convenient to carry for the user to charge his/her portable electronic devices anywhere and anytime.

Figure 8:
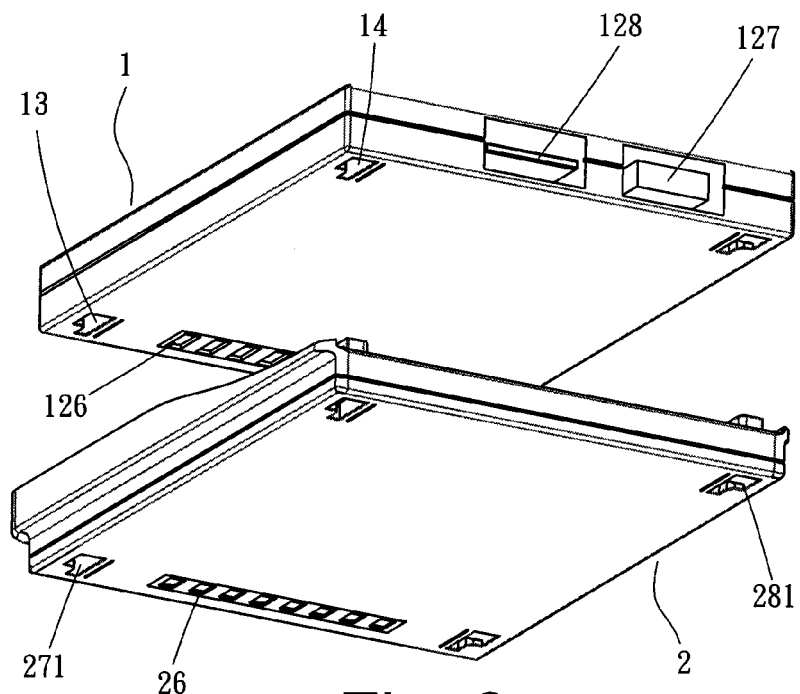
FIG. 8 is a schematic drawing showing the power control module to be stacked with the individual battery.
Figure 9:
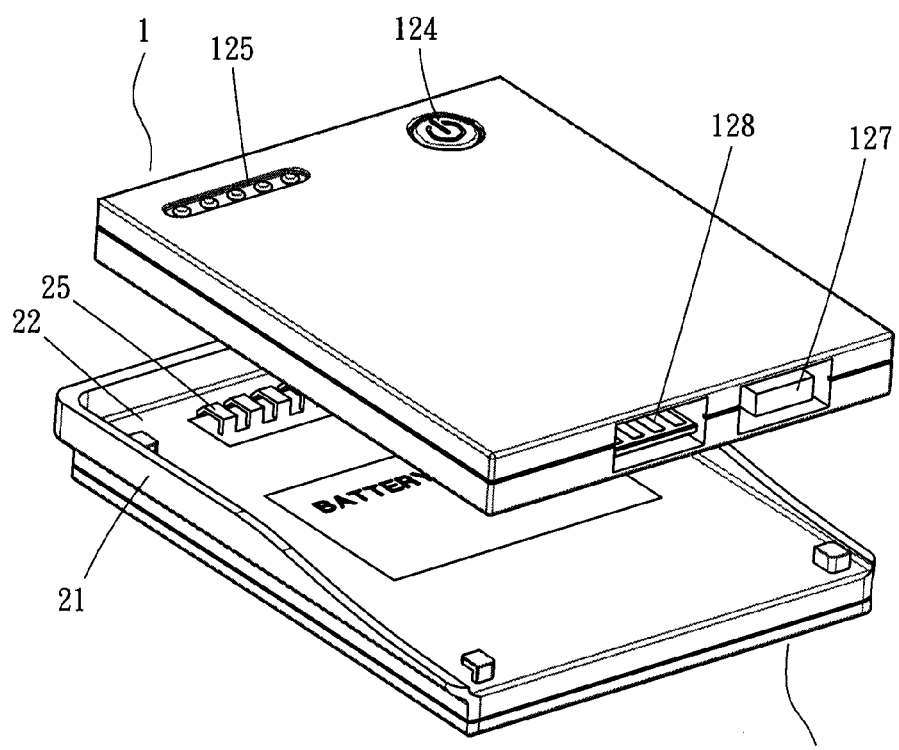
FIG. 9 is another schematic drawing showing the power control module to be stacked with the individual battery unit.
Figure 10:
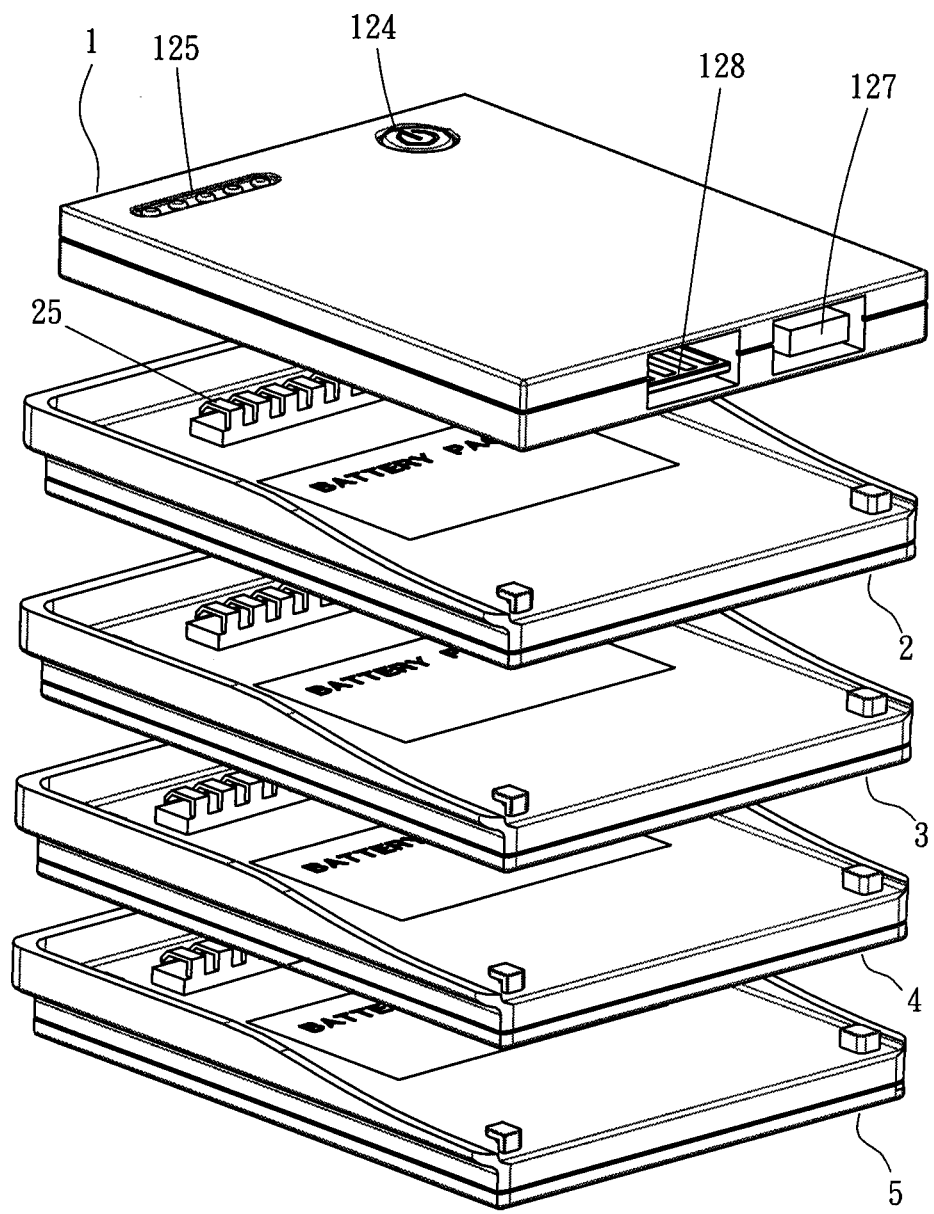
FIG. 10 is a schematic drawing showing the power control module to be stacked with plural said individual battery unit.

Referring to FIG. 8 and FIG. 10, the power control module 1 and each of the individual battery units 2, 3, 4, 5 may alternatively have their first port 126 and third port 26 located at the backs of their enclosures 11, 21, respectively. In such a case, the user can assemble the power control module 1 and the individual battery unit 2 and/or the additional battery units 3, 4, 5 through a stacking operation instead of the foregoing slide-in operation where the components are stacked vertically as an integral.

What is claimed is:

1. A portable external power-supplying device, comprising a power control module and one or more individual battery units; the power control module having an enclosure containing therein a circuit board, the circuit board including a charge controller loop, a buck-boost converter loop, a power manager loop, a button switch, an indicator light set, a first port, a power inlet and a power outlet, the enclosure having a back provided with a positioning hole and a fixing hole; each of the individual battery units having an enclosure atop provided with an accommodating recess, the individual battery unit including a controller, a cell, a second port and a third port, the controller being electrically connected to the cell, the second port and the third port, wherein the second port faces the accommodating recess of the enclosure and the third port is provided at a side of the enclosure, the accommodating recess of the enclosure of the individual battery unit having a positioning pin and a retaining hook, each of the individual battery units having a back provided with a positioning hole and a fixing hole corresponding to the positioning pin and the retaining hook of another said individual battery unit, respectively; for assembling the portable external power-supplying device, the power control module sliding into the accommodating recess of the individual battery unit enclosure such that the first port of the power control module is electrically connected to the second port open to the accommodating recess of the individual battery unit, while the positioning hole and the fixing hole of the power control module are engaged with the positioning pin and the retaining hook of the individual battery unit, respectively; after the power control module and the individual battery unit is combined, the second individual battery unit, the third individual battery unit and the fourth individual battery unit are successively assembled so that the second port of one said individual battery unit is electrically connected to and posited by the third port of another said individual battery unit.

2. The portable external power-supplying device of claim 1, wherein in the power control module, the power inlet is electrically connected to the charge controller loop, while the charge controller loop, the buck-boost converter loop and the power manager loop are electrically connected together, and the power manager loop is electrically connected to the button switch and the indicator light set while the buck-boost converter loop is electrically connected to the power outlet and the first port.

3. The portable external power-supplying device of claim 1, wherein in the power control module, the button switch, the indicator light set, the first port, the power inlet and the power outlet of the circuit board are exposed outside the enclosure of the power control module to be visible, accessible and operable to a user from exterior of the portable external power-supplying device.

4. The portable external power-supplying device of claim 1, wherein the power inlet of the power control module serves to connect a terminal of an external adapter and convey a DC power to the power control module and the power outlet of the power control module serves to connect a power supply of an external portable electronic device to be charged.

5. The portable external power-supplying device of claim 1, wherein the first port of the power control module and the third port of each said individual battery unit are provided at backs of the enclosures, respectively, so that the power control module and the individual battery unit and additional said individual battery units are vertically stacked as an integral.

\* \* \* \* \*